United States Patent Office 3,016,694
Patented Jan. 16, 1962

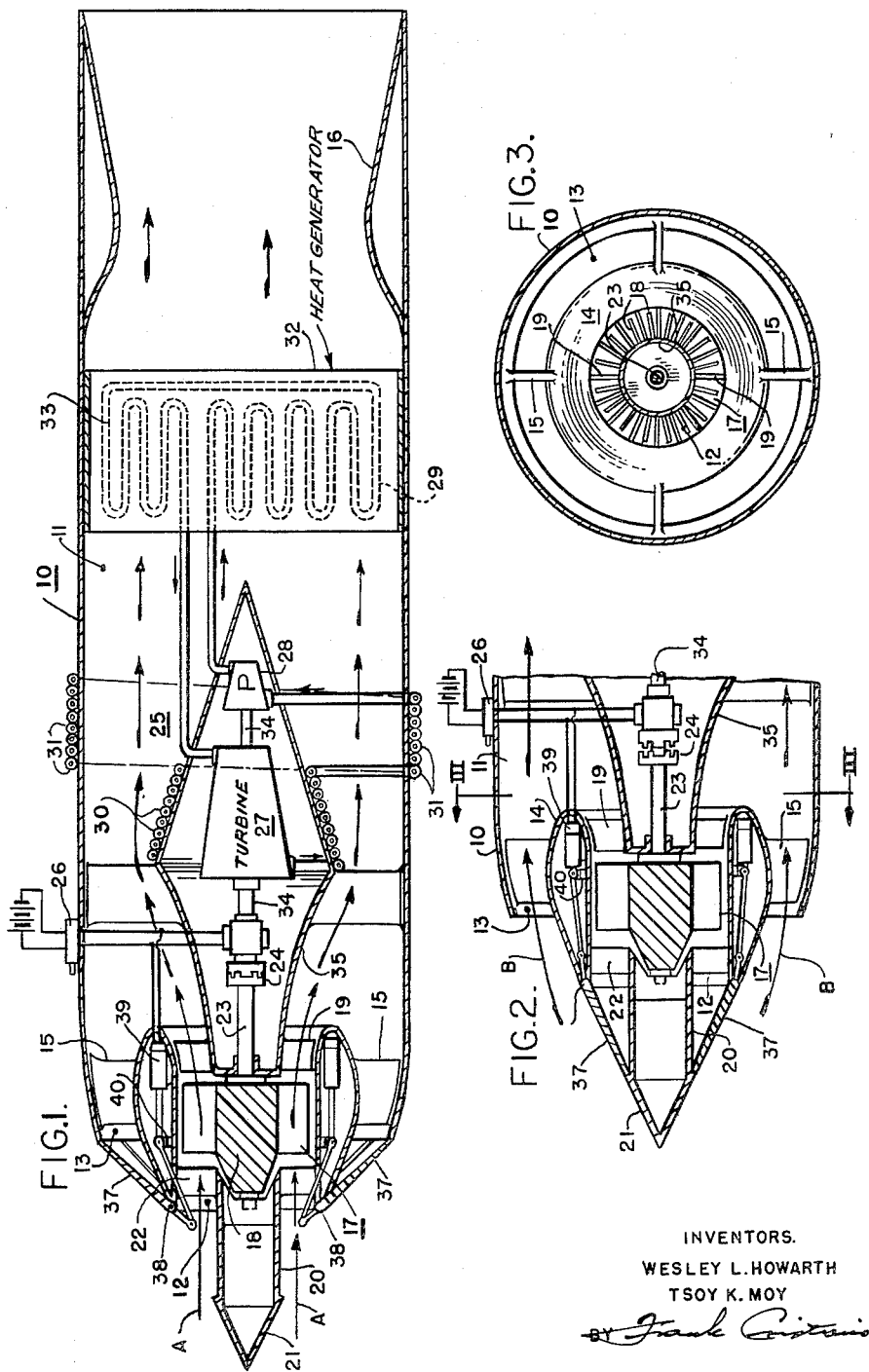

3,016,694
COMBINATION TURBOJET AND RAMJET ENGINE
Wesley L. Howarth, Livermore, and Tsoy K. Moy, San Jose, Calif., assignors to Westinghouse Electric Corporation, East Pittsburgh, Pa., a corporation of Pennsylvania
Filed May 13, 1958, Ser. No. 734,902
4 Claims. (Cl. 60—35.5)

This invention relates to a jet propulsion engine, more particularly to a combination turbo-jet and ram jet engine, and has for an object to provide an improved engine of this type.

It is a further object of the invention to provide a combination turbo-jet and ram jet engine in which the heat generating structure is employed for heating the motive fluid for driving the turbine-compressor power plant as well as the air inducted into the engine by ram effect.

A more specific object is to provide an engine of the above type in which the turbine-compressor power plant is of the closed-cycle type and the engine has a ram air intake opening and a centrally disposed compressor air intake opening.

It is generally known in the art that ram jet engines, though highly efficient at high flight speeds, have insufficient thrust at zero or low flight speeds for satisfactory performance. Accordingly, various arrangements have been previously proposed providing a turbo-jet structure in a ram jet engine for imparting the required initial flight speed to the ram jet engine. All of these prior proposals employ turbine-compressor power plant structures of the open-cycle type wherein the motive gases, after driving the turbine unit, are ejected to atmosphere. Such proposals have resulted in highly complicated arrangements, difficult and costly to manufacture.

In accordance with the invention, there is provided a jet propulsion engine having an outer tubular shell open at both ends and defining an air passageway. One of the open ends forms an exhaust nozzle for ejection of heated air to the atmosphere in a propulsive jet and the other of the open ends is divided into inner and outer concentric air intake openings by an inner tubular structure disposed therewithin.

An axial-flow air compressor is disposed within the inner air intake opening and is driven through a detachable coupling by a gas turbine-compressor power plant of the closed-cycle type. The power plant is charged with a suitable fluid, such as helium, for example, and includes a heat exchanger disposed in good heat transfer relation with a suitable heat generator. The heat generator is disposed in the air passageway and has a passageway for heating air in transit therethrough as well as the motive fluid for the gas turbine power plant.

In operation, the power plant initially is drivingly connected to the air compressor through the coupling to induct air through the inner air intake opening. The thus pressurized air stream flows past the heat generator and is heated thereby, and is subsequently ejected through the exhaust nozzle to the atmosphere to impart the initial propulsive thrust to the engine. During this phase of operation, the engine operates as a turbo-jet to attain suitable flight speed. Upon acceleration to a flight speed suitable for operation of the jet propulsion engine by ram jet action, the air compressor may, if desired, be uncoupled from the gas turbine power plant.

Thereafter, ram air, inducted through the outer air intake opening and heated in transit past the heat generator, is ejected through the exhaust nozzle at a sufficient velocity to sustain and/or increase the flight speed of the engine to considerably higher speeds than attainable by turbo-jet action. Thus, during this phase of operation, the engine operates as a ram jet with high flight speed capability.

A further desirable feature of the invention resides in provision of an annular array of leaves for blocking the outer annular air intake opening during the turbo-jet operating phase and movable into blocking relation with the inner air intake opening during the ram-jet operating phase.

The foregoing and other objects are effected by the invention as will be apparent from the following description and claims taken in connection with the accompanying drawings, forming a part of this application, in which:

FIG. 1 is an axial schematic sectional view of a jet propulsion engine, the engine being shown in condition for operation as a turbo-jet engine;

FIG. 2 is a fragmentary axial schematic sectional view illustrating the forward end portion of the engine shown in FIG. 1 during ram jet operating conditions; and FIG. 3 is a transverse sectional view taken on line III—III of FIG. 2.

Referring to the drawing in detail, there is shown an aviation jet propulsion engine embodying the invention. The engine comprises an open-ended outer tubular casing structure 10 of substantially circular cross-section defining a main air passageway 11. The forward open end portion of the casing (to the left as viewed in FIG. 1) is divided into inner and outer concentric air intake openings 12 and 13 by an inner tubular casing structure 14, of generally toroidal shape. The inner casing 14 is axially supported within the outer casing by a plurality of radial struts 15. The rearward end portion of the outer casing (to the right as viewed in FIG. 1) has nested therein a tubular exhaust nozzle structure 16 of suitable convergent-divergent shape in cross-section. Thus, air received into the engine through the air intake openings 12 and 13 flows into the passageway 11 and is ejected to the atmosphere by the exhaust nozzle 16 in a propulsive jet, as will be subsequently fully described.

An axial-flow air compressor 17, including a bladed rotor 18 and complementary stationary blading 19, is disposed within the inner casing 14 in registry with the inner air intake opening 12. Coaxially aligned with the compressor rotor 18 is a forwardly extending spike member 20 having a conical tip portion 21 and rigidly connected to the inner casing 14 by suitable struts 22.

The air compressor rotor 18 has a rearwardly extending shaft 23 which is drivenly connectible by a suitable clutch mechanism 24 to a turbine-compressor power plant generally designated 25. The clutch mechanism 24 is remotely controlled (as indicated schematically), in response to ambient air speed, by a control system including a Mach meter 26 disposed externally of the casing 10.

The turbine-compressor power plant 25 includes a fluid driven turbine unit 27, a fluid pump 28, a tubular fluid heating structure 29, and a tubular fluid cooling structure 30, 31.

The fluid heating structure 29 may be of any suitable form; however, as illustrated, it comprises a sinusoidally shaped conduit disposed in good heat exchange relation with a suitable heat generator 32. Preferably, though not essentially, the heat generator 32 is of substantially annular shape having a passage 33 and disposed in the main air passageway 11 in a region upstream of the exhaust nozzle 16. The heat generator has been shown diagrammatically, since the specific construction thereof forms no part of the prseent invention.

The turbine unit 27 has a rotor shaft 34, one end of which is connected to the pump 28 and the opposite end of which is connected to the clutch mechanism 24, and the above-mentioned structure is encompassed by an aero-dynamically faired tubular core structure 35 extending rearwardly from the outlet of the compressor 17 to provide smooth flow characteristics to the air flow from the compressor as well as the air flow through the main air passageway 11.

The fluid cooling structure portion 30 comprises a conduit portion spirally wound about the core structure 35 in good heat exchange relation with the air flow through the air passageway 11 while the fluid cooling structure portion 31 comprises a conduit portion spirally wound about the outer engine casing 10 in good heat exchange relation with the ambient atmosphere.

The turbine-compressor power plant is of the closed-cycle type, hence, its units or components, namely, the turbine 27, the pump 28, the fluid heater structure 29 and the fluid cooling structure 30, 31 are interconnected in a closed loop by suitable conduits, in a manner well known in the art, and the power plant is charged with a suitable quantity of fluid, such as helium.

Although the air intake openings 12 and 13 may, if desired, remain continuously open, they may be selectively opened and closed by two-position valve structure including an annular array of leaf elements 37 pivotally connected at 38 to the forward marginal portion of the inner casing 14 and linked to a plurality of reciprocable actuators 39 by a common actuating or unison ring 40 for joint actuation. The leaf elements are so proportioned and arranged that when they are in the position shown in FIG. 1, they define a frusto-conical surface completely blocking the outer air intake opening 13, and when they are moved to the position shown in FIG. 2, they uncover the outer air intake opening and define a frusto-conical surface blocking the inner air intake opening 12. In the latter position, the leaf elements abut the spike member 20 at their free ends and cooperate with the conical tip portion 21 to form an elongated conical surface portion suitable for supersonic flight speeds. The power actuators 39 have been shown as electrically operable and are preferably controlled jointly with the clutch mechanism 24 by the Mach meter control system 26.

In operation from a stationary start, the engine is in the condition shown in FIG. 1, wherein the clutch mechanism 24 is in the engaged position, the leaf elements block the outer air intake opening 13 and the inner air intake opening 12 is uncovered. As the motive fluid in the fluid heating unit 29 is heated by the heat generator 32, it flows through the turbine unit 27 to drive the turbine rotor shaft 34. The pump 28 is thus driven to initiate circulation of the motive fluid through the closed loop and after cooling in the fluid cooling unit 30, 31, the motive fluid is pumped through the fluid heating unit 29 and reheated to sustain operation of the turbine-compressor power plant. Concomitantly therewith, the air compressor 17 is driven by the turbine shaft to draw air (indicated by arrows A) through the inner air intake 12 and pressurize the same. The thus pressurized air flows through the main air passageway 11, past the heat generator 32, wherein it is heated and then ejected through the exhaust nozzle 16 to the ambient atmosphere in a jet, thereby propelling the engine forwardly. During this phase of operation, the engine operates as a turbo-jet engine, which as well known in the art is highly effective in the lower flight speed range up to about sonic velocity or Mach 1.

As the engine attains a supersonic flight speed (above Mach 1), the Mach meter control circuit is actuated by the Mach meter 26 in response to such speed to jointly disengage the clutch mechanism 24 and initiate operation of the power actuators 39. The power actuators 39 retract the unison ring 40, thereby rotating the annular array of leaf elements 37 about the pivots 38 from the position shown in FIG. 1 to the position shown in FIG. 2. In this position, the leaf elements unblock the outer air intake opening 13 and block the inner air intake opening 12, obviating "windmilling" of the deenergized air compressor rotor 18 and permitting air to be drawn into the air passageway through the outer air intake opening 13 by well known "ram" effect, as indicated by arrows B. The air stream thus drawn into the air intake opening 13 flows past the conical tip portion 21 of the spike member and the juxtaposed leaf surfaces with optimum efficiency into the main air passageway 11. The air stream then flows past the heat generator 32, is heated in transit therepast and finally ejected through the exhaust nozzle 16 to the ambient atmosphere in a jet to continue forward propulsion of the engine and accelerate the same to high supersonic speeds. During this phase of operation, the engine operates as a ram jet engine, which, as well known in the art, is highly effective in the supersonic speed range.

During ram jet operation, the air compressor 17 is disconnected from the turbine unit. However, the turbine-compressor power plant is preferably maintained in continuous operation to circulate the motive fluid through the system and avoid overheating of the same.

It will be noted that the fluid cooling structure portion 30 is continuously cooled by air flow through the air passageway 11, while the fluid cooling structure portion 31 is continuously cooled by ambient air flow past the outer surface of the engine casing 10.

It will now be seen that the invention provides a simple yet highly effective jet propulsion engine which is operable as a turbo-jet engine at take-off and subsonic flight speeds, and as a ram jet at supersonic speeds.

It will further be seen that a single heat generator is provided which is effective to heat the motive fluid in the power plant 25 and to heat the air flow during turbojet operation as well as ram-jet operation of the engine.

While the invention has been shown in but one form, it will be obvious to those skilled in the art that it is not so limited, but is susceptible of various changes and modifications without departing from the spirit thereof.

What is claimed is:

1. A combination turbojet-ramjet power plant comprising an elongated outer tubular casing having an air intake opening at one end and an air exhaust nozzle at the other end, said outer casing defining an air passageway communicating with said intake opening and said exhaust nozzle; an inner tubular structure substantially concentrically disposed within said outer casing and dividing said air intake opening into inner and outer concentric openings; a heat generator disposed in said passageway for heating air received through said intake openings prior to ejection through said exhaust nozzle in a propulsive jet; an air compressor disposed within said inner tubular structure and having its inlet in communication with the inner intake opening and its outlet in communication with said air passageway upstream of said heat generator; valve means for selectively blocking and unblocking said inner intake opening; and means including a closed-cycle fluid turbine power plant for driving said compressor, said turbine power plant including a fluid turbine unit drivingly connected to said air compressor, a fluid cooling unit, a fluid pump unit, and conduit structure for containing the motive fluid for said turbine unit and interconnecting said units in a closed-loop, said conduit structure further including means defining a fluid passageway in good heat exchange relation with said heat generator.

2. A combination turbojet-ramjet power plant comprising an elongated outer tubular casing having an air intake opening at one end and an air exhaust nozzle at the other end; an inner tubular structure substantially concentrically disposed within said outer casing and dividing said air intake opening into inner and outer concentric portions; a heat generator disposed within said outer casing and having a passage extending therethrough permitting air received through said intake opening to be ejected through said exhaust nozzle in a propulsive jet, said heat generator being in good heat exchange relation with said passage, whereby to heat the air flow in transit therethrough; an air compressor disposed within said inner tubular structure and having its inlet in communication with said inner intake portion and its outlet in communication with said exhaust nozzle; means including a closed-cycle fluid turbine power plant for driving said compressor, said turbine power plant including a fluid turbine unit drivingly connected to said air compressor, a fluid cooling unit, a fluid pump unit, conduit structure for containing the motive fluid for said turbine unit and interconnecting said units in a closed-loop, said conduit structure further including means defining a fluid passageway in good heat exchange relation with said heat generator; and two-position valve means disposed adjacent said air intake openings and movable from a first position blocking said outer intake portion to a second position unblocking said outer intake portion.

3. A combination turbojet-ramjet power plant comprising an elongated outer tubular casing having an air intake opening at one end and an air exhaust nozzle at the other end; an inner tubular structure substantially concentrically disposed within said outer casing and dividing said air intake opening into inner and outer concentric portions; a heat generator disposed within said outer casing and having a passage extending therethrough permitting air received through said intake opening to be ejected through said exhaust nozzle in a propulsive jet, said heat generator being in good heat exchange relation with said passage, whereby to heat the air flow in transit therethrough; an air compressor disposed within said inner tubular structure and having its inlet in communication with said inner intake portion and its outlet in communication with said exhaust nozzle; means including a closed-cycle gas turbine power plant for driving said compressor, said turbine power plant including a gas turbine unit drivingly connected to said air compressor, a clutch for disconnecting said air compressor from said turbine unit, a gas cooling unit, a gas pump unit, said gas pump unit being drivingly connected to said turbine unit, conduit structure interconnecting said units in a closed loop, said conduit structure further including means defining a gas passageway in good heat exchange relation with said heat generator; two-position valve means including an annular array of leaves movable from a first position blocking said outer intake portion to a second position unblocking said outer intake portion and blocking said inner intake portion; and actuating means for jointly controlling said clutch and said leaves, said actuating means being operable to disconnect said clutch when said leaves are moved to said second position and to reconnect said clutch when said leaves are moved to said first position.

4. A combination turbojet-ramjet power plant comprising an elongated outer tubular casing open at opposite ends and defining the outer periphery of a main air passageway; a heat generator disposed within said outer casing and having a passage extending therethrough in communication with said main air passageway; tubular inner structure coaxially disposed within said outer casing, said inner tubular structure dividing one of said open ends into inner and outer coaxial air intake openings, the other of said open ends comprising an exhaust nozzle for ejecting hot air from said passageway to atmosphere in a propulsive jet; an air compressor disposed within said inner tubular structure and communicating at its inlet with said inner intake opening and at its outlet with said passageway, whereby air drawn and compressed by said air compressor is delivered through the heat generator passage and thence through said exhaust nozzle to atmosphere in a propulsive jet; means including a closed-cycle fluid turbine power plant for driving said air compressor, said turbine power plant including a fluid turbine unit drivingly connected to said compressor, a fluid heating unit disposed in good heat exchange relation with said reactor for providing hot motive fluid to said turbine unit, conduit structure connecting said fluid heating unit to said turbine unit in a closed loop, and heat exchange structure for cooling the motive fluid after expansion in said turbine unit, said heat exchange structure defining a fluid passage in good heat exchange relation with said main air passageway upstream of said heat generator; and valve means for blocking and unblocking at least one of said air intake openings.

References Cited in the file of this patent

UNITED STATES PATENTS

| | | |
|---|---|---|
| 2,159,758 | Dierich | May 23, 1939 |
| 2,632,295 | Price | Mar. 24, 1953 |
| 2,696,078 | Waitzman | Dec. 7, 1954 |
| 2,832,192 | Budish | Apr. 29, 1958 |
| 2,909,894 | O'Donnell | Oct. 27, 1959 |

FOREIGN PATENTS

| | | |
|---|---|---|
| 977,495 | France | Nov. 15, 1950 |
| 754,559 | Great Britain | Aug. 8, 1956 |

OTHER REFERENCES

Engineering, Feb. 28, 1958, pp. 268, 269.

Space/Aeronautics Engineering, April 1959, 60/Atomic Condensed from "Application of Atomic Engines in Aviation," Military Press of USSR Defense Ministry, Moscow, 1957. (Pages 47 and 48 relied on.)